(12) United States Patent
Huchedé et al.

(10) Patent No.: US 11,688,009 B2
(45) Date of Patent: *Jun. 27, 2023

(54) MINIMIZATION OF THE CONSUMPTION OF DATA PROCESSING RESOURCES IN AN ELECTRONIC TRANSACTION PROCESSING SYSTEM VIA DEFERRAL OF PHYSICAL DELIVERY

(71) Applicant: Chicago Mercantile Exchange Inc., Chicago, IL (US)

(72) Inventors: Florian Huchedé, Chicago, IL (US); Xinrui Wang, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,871

(22) Filed: Jan. 13, 2022

(65) Prior Publication Data

US 2022/0138852 A1 May 5, 2022

Related U.S. Application Data

(63) Continuation of application No. 16/783,713, filed on Feb. 6, 2020, now Pat. No. 11,257,157.

(51) Int. Cl.
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
None
See application file for complete search history.

(56) References Cited

U.S. PATENT DOCUMENTS

| | | |
|---|---|---|
| 7,831,491 B2 | 11/2010 | Newell et al. |
| 7,853,499 B2 | 12/2010 | Czupek et al. |
| 2005/0096999 A1 | 5/2005 | Newell et al. |
| 2007/0239589 A1* | 10/2007 | Wilson, Jr. ............. G06Q 40/04 705/37 |

(Continued)

*Primary Examiner* — Bruce I Ebersman
*Assistant Examiner* — Matthew Cobb
(74) *Attorney, Agent, or Firm* — Lempia Summerfield Katz LLC

(57) ABSTRACT

The disclosed embodiments relate to automated enablement of deferred physical delivery of an asset, for which physical delivery is called for in a bilateral contract, by automatically settling the bilateral contract among the parties thereto with positions in specifically tailored futures contracts with a defined later delivery date and, based thereon, extinguishing the bilateral contract requirement for physical delivery. This electronic substitution of equivalent futures positions for both parties in place of the physical delivery requirement, the delivery and payment obligations are bifurcated enabling either party to continue, unpenalized, with their respective obligation irrespective of the other party's actions, enabling the resultant positions available for offsetting/netting, so as to readily exit a position or utilize it to reduce monetary requirements, e.g., for margin or other requirements, as well as reduce the data storage requirements and/or computational resource requirements associated with storing and/or processing the data indicative of those positions.

24 Claims, 4 Drawing Sheets

(56) References Cited

U.S. PATENT DOCUMENTS

| | | | |
|---|---|---|---|
| 2008/0097888 A1* | 4/2008 | Sugihara | G06Q 40/06 705/37 |
| 2009/0254471 A1* | 10/2009 | Seidel | G06Q 40/06 705/37 |
| 2011/0295726 A1* | 12/2011 | Mueller | G06Q 40/06 705/37 |
| 2013/0117169 A1* | 5/2013 | Sturm | G06Q 40/08 705/37 |
| 2014/0006243 A1 | 1/2014 | Boudreault et al. | |
| 2014/0136389 A1 | 5/2014 | Mueller et al. | |
| 2014/0229351 A1* | 8/2014 | Lutnick | G06Q 40/04 705/37 |

* cited by examiner

MINIMIZATION OF THE CONSUMPTION OF DATA PROCESSING RESOURCES IN AN ELECTRONIC TRANSACTION PROCESSING SYSTEM VIA DEFERRAL OF PHYSICAL DELIVERY

REFERENCE TO RELATED APPLICATIONS

This application is a continuation under 37 C.F.R. 1.53(b) of U.S. patent application Ser. No. 16/783,713 filed Feb. 6, 2020, now U.S. Pat. No. 11,257,157, which is hereby incorporated by reference in its entirety and relied upon.

BACKGROUND

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price, referred to as the strike price, on or before a certain expiration date. An option contract offers an opportunity to take advantage of futures price moves without actually having a futures position and is considered "in the money" when the strike price is favorable to the market price of the underlier. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

Typically, the terms and conditions of each futures contract are standardized as to the specification of the contract's underlying reference commodity, the composition of the commodity, quantity, delivery date, and means of contract settlement. Such standardization may improve the liquidity of these contracts, e.g. the ease with which such contracts may be bought or sold. In embodiments described herein, terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives. As will be discussed, an underlier of a futures contract may be a currency, e.g. the contract may be for delivery on a specified date of a quantity of Euros in exchange for a defined payment in U.S. dollars.

With regard to currency transactions, a spot or outright currency transaction is simply the exchange of one currency for another currency, at the current or spot rate, or a "currency pair." While the transaction may be concluded immediately in a variety of interbank markets, sometimes via telephone, or increasingly via electronic trading systems, payment or settlement typically is concluded two business days hence. It is possible, if mutually agreed, to settle or value a transaction on a one business day basis, as is the standard convention with transactions between the Canadian dollar (CAD) and U.S. dollar (USD). Quotes may be in either "American terms" or "European terms."

A forward contract, such as a currency forward contract, is a bilateral contract for delivery of an asset at a later date for a price determined at the inception of the contract. For currencies, a currency forward contract is a bilateral contract for delivery, actual or cash settled depending on the contract terms, of an amount of a particular currency, e.g. Euros, at a future date at a price, delineated in a different currency, e.g. dollars, determined at the inception of the contract. Unlike a futures contract, a forward contract is traded "over the counter," bilateral, e.g. negotiated directly between the parties, and may not be standardized as to its terms. Option contracts on a forward contract are also available offering the buyer thereof the right, but not the obligation, to sell or buy the underlying forward contract at a specified price on or before a certain expiration date. Forward contracts may be physically settled, e.g. via the delivery of the amount of the particular currency called for in the contract, or cash settled via delivery of the cash difference, denominated in currency of the contract price, between the contract price and the spot price of the currency to be delivered, which may be the differential in exchange rates between when the contract was entered into and the delivery date.

An FX swap may be thought of as a combination of two offsetting currency transactions separated by time and constitute the largest segment of the FX marketplace in terms of daily turnover. An FX swap is executed when you swap one currency for another on a nearby value date ("near date") only to reverse the transaction on a subsequent value date ("far date.").

Currency futures may be considered akin to a forward contract, and typically are priced as such, except that they are traded on a regulated futures exchange subject to standardized terms and conditions, and traded, typically anonymously as to the trading parties, via a central counterparty clearing house, described below, instead of bilaterally. Exchange traded currency futures have historically been distinguished from OTC FX transactions by their standardization vs. flexibility or customization inherent in working with a dealer. Thus, one may buy or sell 12,500,000 JPY for delivery on the third Wednesday of June 2013; or, 125,000 Euros for delivery on the third Wednesday of September 2013. Traders who "go long" or buy JPY/USD futures are committed to take or accept delivery of 12,500,000 JPY while, traders who "go short" or sell EUR/USD futures are committed to make delivery of 125,000 Euros. The short making delivery is compensated by the buyer accepting delivery by an amount equal to the futures settlement price quoted in USD on the last day of trading. Noting that the JPY/USD futures contract is based on 12,500,000 yen, this means that the June 2013 contract was valued at $126,475.00 (=12,500,000 yen×0.010118 dollars/yen). The minimum allowable price fluctuation or "tick" in JPY/USD futures is $0.000001 yen per dollar or $12.50 (=$0.000001× 12,500,000 yen).

Like any futures contract, FX futures are secured by performance bonds that are posted by both buyers and sellers. The performance bond or margin requirement may reflect one day's maximum anticipated price movement. Subsequently, these positions are marked-to-market (MTM) daily by the Exchange clearing house, i.e., any profits or losses are posted to the trader's account on a daily basis. Thus, there are no paper profits or losses in futures.

The major currency futures typically call for the actual delivery of these currencies on deposit at designated foreign financial institutions through the Continuous Linked Settlement (CLS) system. CLS, a third-party system which is external to an exchange, may be thought of as essentially an escrow service ensuring that payment of one currency is made vs. the other currency. But often it becomes impractical to provide for such delivery when, for example, exchange restrictions are in force with respect to a particular currency. Under such cases, the currency may trade as non-deliverable forward (NDF) in the over-the-counter or interbank currency markets as described above. There are in fact some currency futures contracts based on non-deliverable currencies which are settled in cash upon futures contract expiration. This provision allows for extension of futures products to currencies including the Chinese Yuan (RMB), Brazilian Real (BRL) and other generally inconvertible currencies. These contracts are cash settled vs. a representative price surveyed from the interbank NDF markets. Using CLS requires electronically transmitting the transactions thereto which adds processing delay and consumes available network bandwidth, etc.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and reduces risk of financial loss due to breach of contract by assuring performance on each contract. A clearing member is a firm qualified to clear trades through the clearing house.

Futures contracts, including currency futures, must list specifications including the size of the contract, the minimum price increment, and the corresponding tick value. These specifications help traders determine position sizing and account requirements, as well as the potential profit or loss for different price movements in the contract. The euro/U.S. dollar contract, for example, shows a minimum price increment of 0.0001, and a corresponding tick value of $12.50. This indicates that each time there is a 0.0001 movement in price, the value of the contract will change by $12.50 with the value dependent on the direction of the price change. For instance, if a long trade is entered at 1.3958 and moves to 1.3959, that 0.0001 price move would be worth $12.50 to the trader (assuming one contract). If that same long trade moves to 1.3968, the price move would be worth $125.00 ($12.50×10 ticks or pips).

An exchange computer system may operate under a central counterparty model, where the exchange acts as an intermediary between market participants for the transaction of financial instruments. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty. For example, the exchange computer system insulates one market participant from the default by another market participant. Market participants need only meet the requirements of the exchange computer system. Anonymity among the market participants encourages a more liquid market environment as there are lower barriers to participation. The exchange computer system can accordingly offer benefits such as centralized and anonymous matching and clearing.

A match engine, which may also be referred to herein as a module or match/matching engine processor, within an exchange trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high-volume messaging activity. With limited processing capacity, high messaging volumes may increase the response time or latency experienced by market participants.

As discussed above, forward contracts for the same underlier may be either physically settled or cash settled. As opposed to physical delivery called for by a futures contract which occurs via a clearing house of a central counterparty, a physical delivery requirement of a forward contract calls for actual delivery of the underlying asset by the selling party to the buying party upon expiration, such as via a foreign banking institution.

Not only may physically delivering an asset be inconvenient, making cash settlement preferred by the selling party or central counterparty, the difference in the treatment of a physically settled contract vs. a cash settled contract may create other inconveniences. For example, simply obtaining the asset in the requisite quantity to meet the delivery obligation may be difficult, as opposed to crediting the other party with the value of the asset and letting them acquire it themselves. Further, physical delivery obligations may be treated differently from cash settlement obligations under regulatory requirements, such as those directed to mitigating risk of default by requiring that the asset be held in escrow or by a third party so as to ensure performance, placing a higher burden on the parties to meet those requirements. In addition, a party holding both cash settled and opposing physically settled obligations for the same underlier may be unable to realize advantages from offsetting those positions against each other or netting their risk together, due to the differences in how those positions are treated.

Furthermore, even for centrally cleared forward contracts which use a centralized third party, e.g. a clearing house, to simplify the bilateral transaction between the parties, the clearinghouse may be required to keep a certain amount of the asset "on deposit" so as to ensure satisfaction of the agreement should one party be unable to meet its obligation.

This may require the parties to keep substantial amounts of the deliverable asset, e.g. currency, on deposit with the clearinghouse to cover large transactions. This may make cash settlement preferred by contract intermediaries, such as clearing houses.

Nevertheless, physical delivery may still be preferred by some parties. For example, a party that requires the asset but does not wish to undertake the responsibility of having to go out and buy it themselves may prefer to have the selling party undertake that responsibility. Particularly for assets which may be hard to obtain or whose value may fluctuate, e.g. due to changes in exchange rates, between when a cash settled contract is completed and the buying party can take the cash settlement and actually obtain the asset. This may make physically delivered contracts more desirable by some parties.

Many parties enter into forward transactions with the intention of selling their position prior to expiration, i.e. they have no intention of either making or taking delivery of the asset. Where the desirability of physically delivered contracts exceeds the desirability of cash settled contracts for the same underlier, it may be easier to dispose, i.e. buy or sell, these contractual obligations prior to expiration of the contract. That is, even if a party prefers a cash settled contract, they may enter into a physically settled contract, or buy an existing position therein, as their ability to sell their position prior to expiration/delivery may be easier, i.e. the market for physically delivered contracts may be more liquid than for cash settled contracts.

Accordingly, it will be appreciated that deferring or eliminating a physical delivery requirement for a party to a transaction who prefers to avoid such a requirement, while maintaining the option of physical delivery for the other party, may be desirable. Furthermore, eliminating or minimizing reliance on third-party systems may reduce processing delays and network bandwidth utilization.

DETAILED DESCRIPTION

Figure 1:
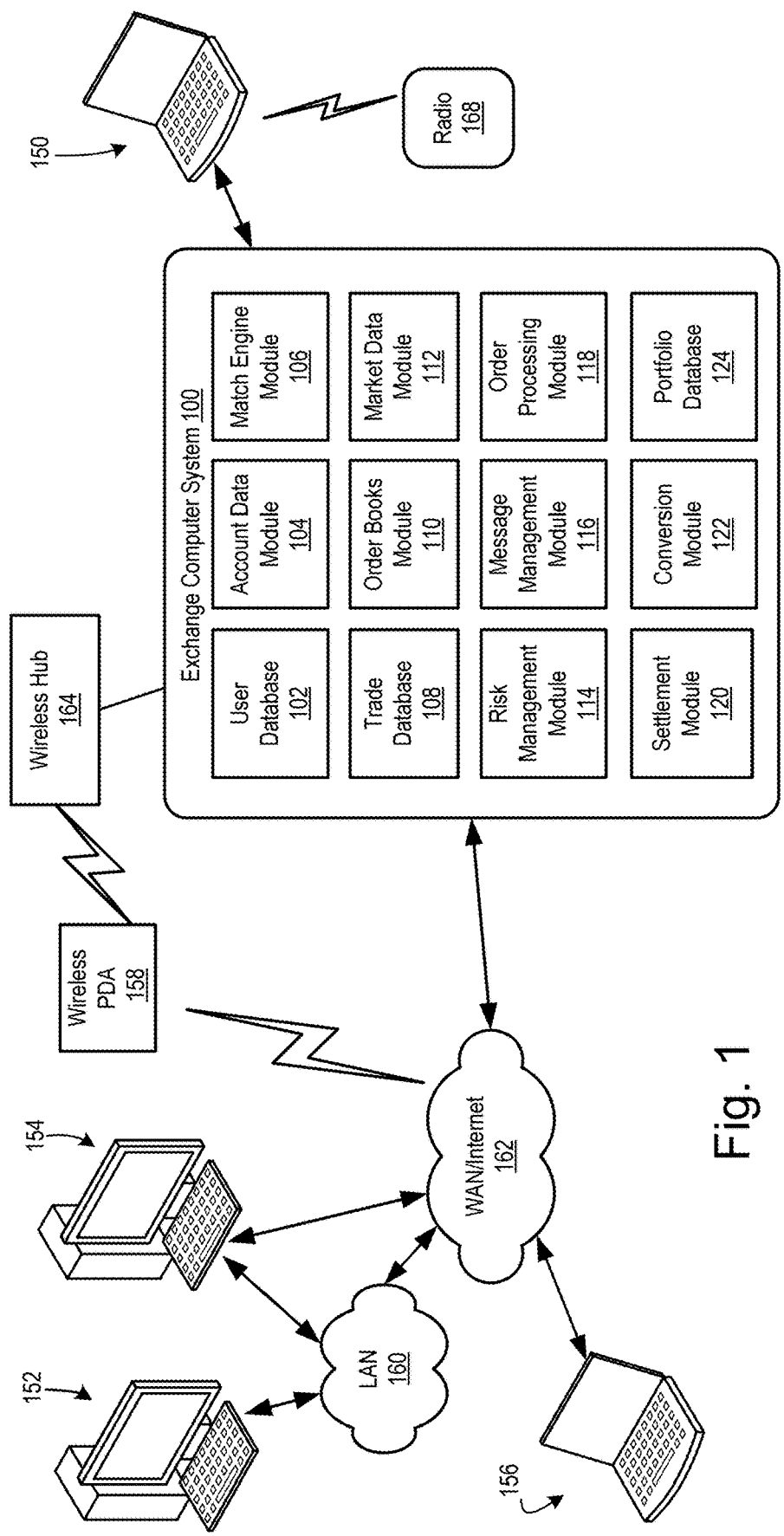
FIG. 1 depicts a computer network system, according to some embodiments.

The disclosed embodiments relate to a system for automated enablement of deferred physical delivery of an asset, for which physical delivery is called for in a bilateral contract, by automatically settling the bilateral contract among the parties thereto with, i.e., delivering, positions in specifically tailored futures contracts with a defined later delivery date for the asset and, based thereon, extinguishing the bilateral contract requirement for physical delivery. By substituting a financially equivalent futures position for both parties in place of the physical delivery requirement, the disclosed embodiments further bifurcate the delivery obligation from the payment obligation. This enables either party to continue, unpenalized, with their respective obligation if they so choose irrespective of the other parties' actions. Further, this bifurcation enables the resultant positions to be utilized for offsetting or netting, so as to readily exit a position or utilize that position to reduce monetary requirements such as for margin or other regulatory requirements, as well as reduce the data/database storage requirements and/or computational resource requirements associated with storing and/or processing the data indicative of those positions.

In particular, a clearing house computer system, upon determining that a bilateral forward contract for delivery of a particular currency has, or is about to expire, may compute a financially equivalent position in one or more futures contracts for delivery of the same currency and assign those positions to the parties to the bilateral contract in lieu of the physical delivery obligation therein. The futures contract position is computed so as to replicate, e.g. provide substantially the same, financial characteristics, e.g. profit and loss, as the bilateral contract at the expiration thereof.

By using the internal clearing house computer system of the exchange/electronic trading system as described, reliance on external third party clearing systems, such as CLS, may be eliminated or reduced, reducing transaction processing delays and/or network bandwidth utilization due to having to transmit transactions to such systems. Further, costs may be reduced by eliminating or minimizing fees charged by these third-party services.

While the disclosed embodiments will be described with respect to FX forward contracts, or options thereon, and FX futures contracts, wherein the underlier is a quantity of currency, it will be appreciated that the disclosed embodiments may be applicable to contracts for the physical delivery of any underlier, including physical commodities, cryptographic or other math-derived assets, such as bitcoin, etc.

A futures contract is "in the money" when it has intrinsic value, i.e. the settlement price is favorable to the current market/spot price, e.g. for an obligation to buy, the settlement price is less than the spot price and for an obligation to sell, the settlement price is greater than the spot price. A futures contract is "at the money" when the settlement and spot prices are the same.

In One Embodiment:

$N_{OTC}$ is the notional contract amount of the bilateral forward currency contract, $N_{STD}$ is the notional amount of the selected futures contract;

Spot is the spot rate for the currency to be delivered;

$K_{OTC}$ is the current contract price of the bilateral forward currency contract, i.e. the price that the buyer has agreed to pay for the asset;

$P_{FUT}$ is the price of the selected futures contract at time of settlement of the bilateral forward currency contract; and wherein the profit and loss (PnL) of the bilateral forward currency contract is:

$$N_{OTC} \times (\text{Spot} - K_{OTC})$$

In order to generate futures positions with an equivalent profit and loss characteristic, the disclosed embodiments account for valuation adjustments ("VA"'s) such a VA created by the current price of the futures contract and current spot price of the asset (the profit and loss of the futures trade since inception comparing to the original FX rate), the difference between the current price of the futures contract and the price the buyer agreed to pay for the asset (the cost of exchanging the futures position into spot delivery), and/or the difference in quantity called for by the bilateral contract and the available multiples of the fixed/standardized quantity of the futures contract (the difference caused by the bilateral quantity not being a multiple of the futures standard notional). In particular, in one embodiment three valuation adjustments need to be accounted for and used to adjust the price of the futures contracts:

$VA_{SF}$ is the valuation adjustment between the unadjusted price ($P_{FUT}$) of the selected futures contract and the current market price, e.g. spot price, of the asset;

$VA_K$ is the valuation adjustment between the unadjusted price ($P_{FUT}$) of the selected futures contract and the settlement price ($K_{OTC}$) of the bilateral forward currency contract; and $VA_n$ is the valuation adjustment in notional value due to using a futures contract with a fixed quantity to replicate the quantity called for the bilateral forward currency contract; and wherein the profit and loss (PnL) of the bilateral forward currency contract is:

an at-the-money futures position+$VA_K$−$VA_{SF}$+$VA_n$; or alternatively:

an in-the-money futures position;

wherein, in addition, compensation may be provided for having to round the adjusted futures contract price to the nearest tick specified by the contract.

Generally, the disclosed embodiments may seek to avoid large cash flows via the variation margin process by adjusting the price of the selected futures contract to create an in the money position which substantially replicates the bilateral contract's cash flows plus a cash adjustment for any precision lost, e.g. residual resulting, from having to round the adjusted price to the nearest tick as required by the selected futures contract.

In particular, the adjusted price of the selected futures contract is determined using a Rounding function:

$$K_{FUT} = \text{Round}(Argument1, Argument2)$$
$$= \text{Round}((-((VA_K - VA_{SF} + VA_n)/N_{STD}) + P_{FUT}), \text{tick\_size});$$

and where $$\text{Residual} = N_{STD} \times (-((VA_K - VA_{SF}VA_n)/N_{STD})P_{FUT} - K_{FUT})$$

It will be appreciated that the adjusted price of the selected futures contract may be computed using alternative methods, e.g. using price discovery inputs such as using at least two of the spot price, the futures-spot spread or futures price. That is, the Futures-Spot-Spread=Futures Price−Spot Price, allowing any one of Futures-Spot-Spread, Futures Price or Spot Price to be derived when the other two are known.

The disclosed embodiments provide advantages including: Futures delivery are part of the main continuous linked settlement cycle and therefore don't require additional cost to Member Balance Sheets; Futures contracts are generally very liquid, providing alternative methods by which to dispose of positions, alleviating any hedging or risk management concerns; and the futures contract selected for use herein may be physically settled, preserving that option for those who prefer this type of settlement, while meeting regulatory capital requirements and avoiding gap risk, i.e. a price changing from one level to another with no trading in between. Gap risk is the risk (difference in valuation or PnL) between two identical contracts with same properties with one being cash settled and the other physically settled. With current electronic trading systems, gap risk can't be traded in most products and thus can't be risk managed. In addition, Futures contracts have their notional values compressed daily, reducing portfolio line items and the associated data storage requirements; Futures contracts can be margined (referred to as portfolio margining) along with cleared OTC FX positions providing efficiency; Futures have a 1 day margin period of risk (MPOR) and Initial Margin for futures in 1-day MPOR and 5-day for OTC which minimizes risk; the pool of available Futures contracts for use with the disclosed embodiments may be selected from a pool of available contracts, such as those maturing every month or every quarter, those having the most liquidity, or based on other properties or combinations thereof, thus keeping the Futures price-to-Spot price basis small and minimizing the necessary adjustment therefore described above; and Futures contracts have a relative small notional value which minimizes the adjustment therefore, as described above, wherein the maximum will be ½ the standard notional of the contract, e.g. on a notional contract value of Euro 125,000, the adjustment would be Euro 62,500. It is noted that, with the present embodiments, Euro 62,500 is a negligible amount compared with the typical amounts traded, e.g. in the hundreds of millions of Euro.

The disclosed embodiments may further operate automatically, e.g., upon expiration of a bilateral contract such as an FX forward contract, to identify a suitable futures contract, e.g., a futures contract calling for physical delivery of the same asset (currency) as the bilateral contract and having the nearest maturity date. Once identified, the disclosed embodiments may automatically compute the quantity of futures contracts required, the adjusted price therefore and the tick/rounding compensation needed to replicate the financial characteristics, e.g. the profit and loss, of the expiring bilateral contract. In one embodiment, the system may maintain, or be coupled with, a database of active bilateral contracts which are periodically evaluated to determine the expiration thereof.

The disclosed technology addresses the need in the art for enabling deferred delivery of a physical asset by one party to another in exchange for a payment therefore while maintaining the same economic attributes of the original transaction. That is, the disclosed embodiments enable one party of a bilateral transaction for the physical delivery of an asset to defer delivery of that asset without financially penalizing the other party or otherwise compromising the rights of the other party to obtain the benefit of the original agreement. Furthermore, the disclosed embodiments reform the expired bilateral agreement into a set of bifurcated positions in a futures contract for the physical delivery of the asset thereby enabling previously unavailable capabilities of each party to dispose of their position without affecting the other party's position, or otherwise, utilize their position for other purposes, such as to offset another position or net against a margin requirement of another position.

The disclosed embodiments may automate the process of transforming the physical delivery requirement of an expiring or expired bilateral contract into the requisite futures positions and subsequently enabling the trading thereof. Specifically, the disclosed technology solves a problem that uniquely arises in the fields of computer technology and exchange computer systems which must manage physical delivery of assets, where physical delivery requirements are necessarily handled outside of the electronic transaction processing systems which process the transactions therefore. By automatically deferring a physical delivery requirement using futures contract positions, the exchange computer system may enable new functionality which, for example, allows those positions to be disposed of so as to avoid the physical delivery requirement. Furthermore, the disclosed embodiments enable an electronic trading system to utilize its existing settlement systems, avoiding having to transmit transactions to the external settlement systems of third-parties, e.g. CLS. By avoiding transmission to external systems, transactions may be processed faster and consumption of network communications bandwidth is reduced.

The disclosed embodiments are drawn to systems and methods that include specific computing components, each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computer system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined by equations. Products, e.g., financial instruments, or order books representing the state of an electronic marketplace for a product, may be represented as data objects within the exchange computer system. The instructions may also be conditional, e.g., buy or sell a quantity of a product at a given value if a trade for the product is executed at some other reference value. The data transaction processing system may include various specifically configured conversion processors that convert, e.g., automatically, data objects representative of bilateral contracts, which have or will expire, and convert those data objects into two more new data objects indicative of futures positions which substantially replicate the characteristics of the original data object.

The application may be executed by one or more of the conversion processors. Thus, the application may be a software conversion module, such as the conversion module illustrated in FIG. 3 described in more detail below.

Exchange Computer System

An exchange provides one or more markets for the purchase and sale of various types of products including financial instruments such as stocks, bonds, futures contracts, options, currency, cash, swaps and other similar instruments. Agricultural products and commodities are also examples of products traded on such exchanges. As was described above, a futures contract is a product that is a contract for the future delivery of a financial instrument such as a quantity of grains, metals, oils, bonds, currency, or cash settled against a rate. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g., variable commodities), the specification may further define variables, step sizes, premiums, or discounts for use in processing orders. The exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers or may be characterized by more aggressive actions so as to maintain risk and/or exposure as a speculative investment strategy. From an alternate perspective, a market maker may be considered a market participant who places an order to sell at a price at which there is no previously or concurrently provided counter order. A market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and may also feature high volumes of executed transactions indicating that large quantity orders may be executed without driving prices significantly higher or lower.

As was described above, a financial instrument trading system, such as a futures exchange, such as the Chicago Mercantile Exchange Inc. (CME), provides a contract market where financial instruments, e.g., futures and options on futures, are traded using electronic systems and may operate under a central counterparty model, where the exchange acts as an intermediary between market participants for the transaction of financial instruments.

Electronic messages such as incoming messages from market participants, i.e., "outright" messages, e.g., trade order messages, etc., are sent from client devices associated with market participants, or their representatives, to an electronic trading or market system.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell various quantities of that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade therebetween to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of an instrument at a price, and the other order includes instructions for or specifies selling a (different or same) quantity of the instrument at a same or better price. It should be appreciated that performing an instruction associated with a message may include attempting to perform the instruction. Whether or not an exchange computer system is able to successfully perform an instruction may depend on the state of the electronic marketplace.

While the disclosed embodiments will be described with respect to a product by product or market by market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, swap, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it may be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems offer an efficient, fair and balanced market where market prices reflect a true consensus of the value of products traded among the market participants. Electronic marketplaces use electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the exchange or electronic trading system operated thereby, the following sequence describes how, at least in part, information may be propagated in such a system and how orders may be processed: (1) An opportunity is created at a matching engine of the exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e., counter to the resting order; (5) The exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

As was described above, the exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computer system may receive conditional orders or messages for a data object, where the order may include two prices or values: a reference value and a stop value. A conditional order may be configured so that when a product represented by the data object trades at the reference price, the stop order is activated at the stop value. For example, if the exchange computer system's order management module (described below) includes a stop order with a stop price of 5 and a limit price of 1 for a product, and a trade at 5 (i.e., the stop price of the stop order) occurs, then the exchange computer system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all the identified orders have been considered or all the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computer system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming order, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house also manages the delivery process.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants relatively quickly. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Clearing houses, like the CME clearing house, may specify the conditions of delivery for the contracts they cover. The exchange designates warehouse and delivery locations for many commodities. When delivery takes place, a warrant or bearer receipt that represents a certain quantity and quality of a commodity in a specific location changes hands from the seller to the buyer who then makes full payment. The buyer has the right to remove the commodity from the warehouse or has the option of leaving the commodity at the storage facility for a periodic fee. The buyer could also arrange with the warehouse to transport the commodity to another location of his or her choice, including his or her home, and pays any transportation fees. In addition to delivery specifications stipulated by the exchanges, the quality, grade, or nature of the underlying asset to be delivered are also regulated by the exchanges.

The delivery process may involve several deadlines that are handled by the exchange clearing house. Different commodities may include different parameters and timing for delivery. The first deadline of an example delivery process is called position day. This is the day that the short position holder in the market indicates to the exchange clearing house that the holder intends to make delivery on his futures position and registers a shipping certificate in the clearing delivery system. Also, starting on the first position day, each participant reports all of its open long positions to the clearing house. The clearing house ranks the long positions according to the amount of time they have been open and assigns the oldest long position to the short position holder that has given his intention to deliver.

At a second deadline, referred to as notice day, the short position holder and long position holder receive notification that they have been matched, and the long position holder receives an invoice from the clearing house. A third deadline is the actual delivery day. The long position holder makes payment to the clearing house, and the clearing house simultaneously transfers the payment from the long to the short position holder, and the shipping certificate is transferred from the short to the long position holder. Now the long position holder is the owner of the shipping certificate and the participant has several options. In an example of grain, the participant can hold the certificate indefinitely, but must pay the warehouse that issued the certificate storage charges, that are collected and distributed monthly by the clearing house. The participant can cancel the shipping certificate and order the issuing warehouse to load-out the physical commodity into a conveyance that he places at the issuing warehouse. The participant can transfer or sell the certificate to someone else. Or the participant can go back into the futures market and open a new position by selling futures, in which case he now becomes the short position holder. The participant may then initiate a new three-day delivery process, that would entail re-delivery of the warehouse certificate the participant now owns. During this time, the participant will continue to pay storage charges to the warehouse until he re-delivers the certificate.

Computing Environment

The embodiments may be described in terms of a distributed computing system. The examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 120, 152, 154, 156 and 158, as described herein, coupled with the exchange computer system 100. Wherein the exchanges computer system 100 implements clearing functions, as described herein, it may also be referred to as a central counterparty computing system 100.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
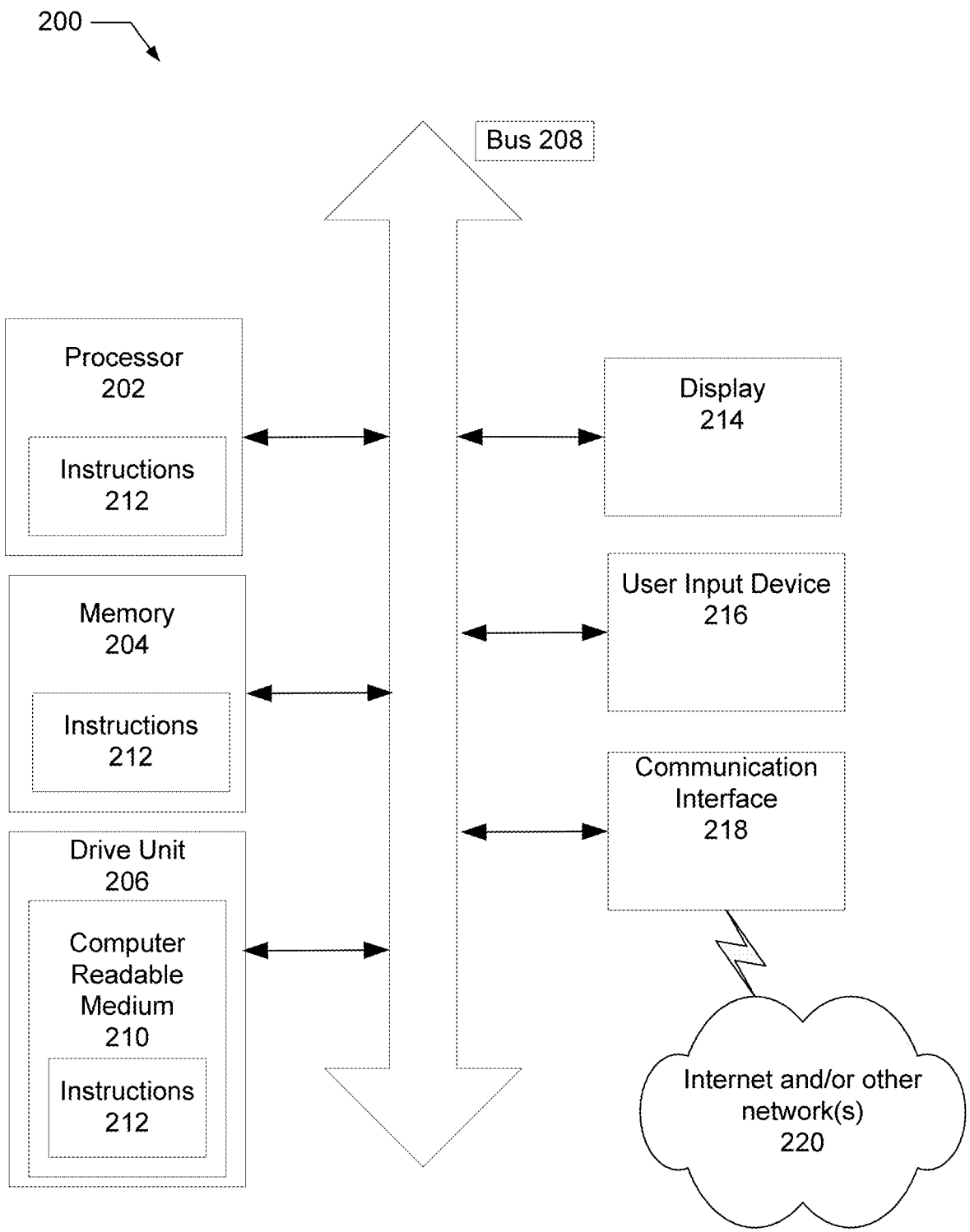
FIG. 2 depicts a general computer system, according to some embodiments.

The exchange computer system 100 may be implemented with one or more mainframes, desktops, or other computers, such as the example computer 200 described herein with respect to FIG. 2. A user database 102 may be provided which includes information identifying traders and other users of exchange computer system 100, such as account numbers or identifiers, usernames, and passwords. An account data module 104 may be provided which may process account information that may be used during trades. The account data module 104 may store relationship information for the participants of the exchange. For example, the account data module 104 may store credit relationship data that defines credit relationships between participants. The account data module 104 may store data that defines which participants other participants are willing to trade with or otherwise complete contracts. Certain participants, for example, may wish to avoid trading with a competitor or otherwise unwelcome trading partner. Certain participants may be denied the opportunity to trade with other participants due to regulatory actions or legal reasons. A portfolio database 124 may be maintained by the account data module 104, as or part of separate from, the user database 102, and which is further coupled with the settlement module 120, described below. The portfolio database 124 stores one or more data records in association with each trader, or trading entity, which contain data indicative of current/open positions held by the trader or trading entity, such as positions in one or more futures contracts, or options thereon, which have not yet reached their maturity or have otherwise been offset or otherwise closed out. Each data record may store data indicative of the details of the position held by the trader/trading entity, such as side, quantity, settlement price, settlement date, etc. The portfolio database 124 may include, or be coupled with, logic or other functionality which may periodically evaluate the positions held by a trader/trading entity represented by the stored data to recognize one or more positions which offset one another and wherein positions which are completely offset may be removed from the database to reduce the data storage requirements thereof. Such functionality may be referred to as compression or portfolio compression and may be implemented by the settlement module 120 or the risk management module 114 as part of the analysis of the portfolio for margin determination.

A match engine module 106 may be included to match bid and offer prices and may be implemented with software that executes one or more algorithms for matching bids and offers. A trade database 108 may be included to store information identifying trades and descriptions of trades. Trade database 108 may store information identifying the time that a trade took place and the contract price. The positions created for each counterparty to a completed trade may then be stored as data records in the portfolio database 124 in association with the respective trader/trading entity, i.e. in the trader/trading entity's portfolio.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant associated therewith in the portfolio database 124. The risk management module 114 may be configured to administer, manage, or maintain one or more margining mechanisms implemented by the exchange computer system 100. Such administration, management or maintenance may include managing database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in each message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled order that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 (or order processor 118) may be included to decompose delta-based, spread instrument, bulk, and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 116, or as an independent functioning module. The order processing module 136 may be configured to perform one or more market integrity checks for incoming transactions.

In an embodiment, the order processing module 118 may include one or more market integrity processors that implement market integrity mechanisms such as credit limits, credit banding, velocity logic, or circuit breakers as described below.

As an intermediary to electronic trading transactions, the exchange bears a certain amount of risk in each transaction that takes place. To that end, the clearing house implements processes by which trades are confirmed, matched and settled, as well as risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to clearing, settling, e.g. regulating delivery and payment therefore, or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

Clearing functions implemented by settlement module 120 may be provided, not only for exchange traded instruments, such as futures and options thereon, but also for centrally cleared bilateral transactions. Centrally cleared bilateral transactions are transactions entered into bilaterally, i.e. directly between the parties or via a broker, where the parties have agreed to submit the transaction to a third-party clearing system to confirm the transaction details and complete the transaction, effect risk management over the life of the transaction, and settlement upon conclusion thereof.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

In one embodiment, where the clearing functions are provided independent of any exchange/trading functions, the settlement module 120 may be implemented by a central counterparty computing system separate from the exchange computer system 100.

In one embodiment, the exchange computer system 100 may further include a conversion module 122, which may be a separate module or part of the settlement module 120. As will be described below, the conversion module 122 may determine, e.g. automatically, when a bilateral transaction for physical delivery of an asset is expired, or will expire, and enter the settlement phase for processing thereof by the settlement processor 120 as described above. The conversion module 122 may act to defer the physical delivery obligation, and the corresponding payment therefore, by generating a financially equivalent futures contract positions for the transacting parties in the exchange computer system 120. In one embodiment, the conversion module 122 may operate with respect to centrally cleared bilateral transactions forwarded to the settlement module 120 for clearing. Alternatively, or in addition thereto, the conversion module 122 may be coupled with one or more OTC trading systems to process bilateral transactions traded via those systems as described herein.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits (where traders, or their representatives, all physically stand in a designated location, i.e., a trading pit, and trade with each other via oral and visual/hand based communication) and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange computer system 100 for financial instruments. It should be appreciated that the disclosed embodiments may be implemented as a different or separate module of the exchange computer system 100, or a separate computer system coupled with the exchange computer system 100 to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based computer device, or other wireless device, may communicate with the LAN 160 and/or the Internet 162 via radio waves, such as via Wi-Fi, Bluetooth® and/or a cellular telephone-based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 150 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and may be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In an embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In an embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in some embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel® Xeon® processor or an AMD Opteron™ processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

Figure 3:
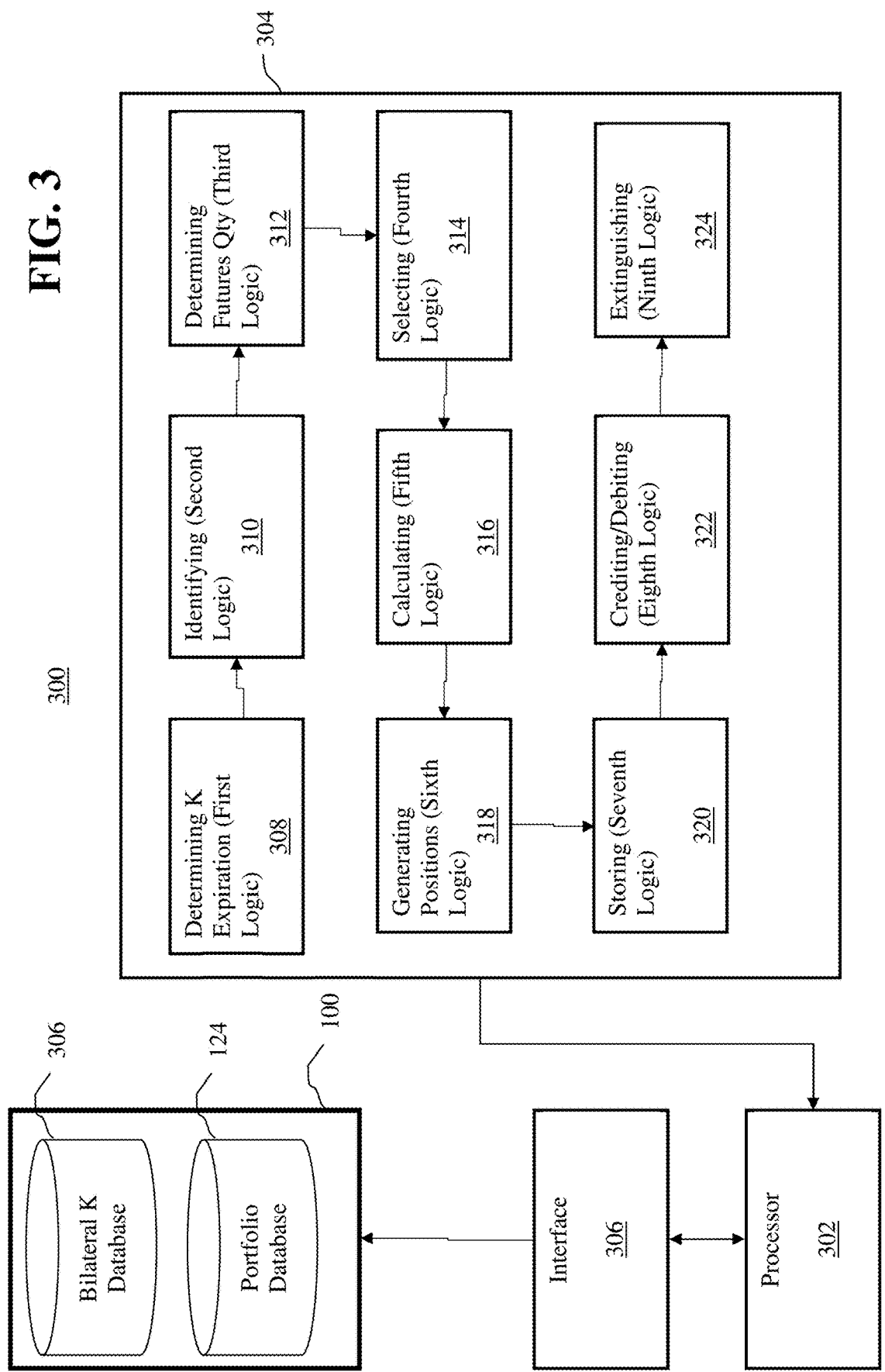
FIG. 3 depicts a block diagram of a system for automatically enabling deferred physical delivery of a first quantity of an asset according to one embodiment.

FIG. 3 depicts a block diagram of a system 300 for automated enablement of deferred physical delivery of a first quantity of an asset, e.g. a currency such as Euros, as required by a bilateral contract, such as a currency forward contract or option contract thereon, which requires, subsequent to expiration, physical delivery of the first quantity of the asset on a particular date by a first participant to a second participant in exchange for a first predefined payment, e.g. in a different currency such as US dollars, therefore according to one embodiment. It will be appreciated that the system 300 may be a part of, or in communication with the Settlement Module 120, or other module of the exchange computer system 100 described above and shown in FIG. 1, or part of, or in communication with, external settlement systems, such as CLS. Alternatively, the system 300 may be part of a central counterparty computer system separate from, but in electronic communication with, the exchange computer system 100. The system 300 includes a processor 302, and a non-transitory memory 304, such as the processor and memory which implement the exchange computer system, and transaction interface 306 coupled therewith, such as the processor 202, memory 204 and/or interfaces 214, 216, 218 described in detail above with reference to FIG. 2. In one embodiment, the transaction interface 306 is coupled with the portfolio database 124 or other database, internal or external to the exchange computer system 100, which stores data representative of bilateral contracts for physical delivery of assets entered into by participants of the electronic trading system implemented by the exchange computer system 100. Alternatively, or in addition thereto, the transaction interface 306 receives messages communicated from an external bilateral contract management system, such as a clearing system, indicating that a requisite bilateral contract has or is about to expire.

The memory 304 being operative to store computer executable instructions, such as in the form of one or more logic components, e.g. first through ninth logic components 308-324, that when executed by the processor 302, cause the processor 302 to: determine that a data record stored in a database 306 coupled with the processor 302, which stores data indicative of the bilateral contract, further indicates that the bilateral contract has expired, or is about to expire, the expired bilateral contract being characterized at expiration by a net value equal to a difference between a current value of the first quantity of the asset and the first predefined payment, e.g. a profit and loss (PnL or $N_{OTC} \times (\text{Spot} - K_{OTC})$) as described above); identify, automatically based on the determination that the bilateral contract has expired, a futures contract currently traded on an electronic trading system implemented by the exchange computer system 100 at a current price, of a set of incremental prices (e.g. ticks), which calls for delivery at a future date of a second quantity, e.g. the contract quantity, of the asset in exchange for a second predefined payment, the second quantity being less than the first quantity; determine a whole number quantity of the identified futures contracts, each for the second, contract, quantity, which are needed to come closest to, without exceeding, the first quantity (or alternatively, which just exceed the first quantity); select an adjusted price, e.g. $K_{FUT} = \text{Round} \ ((-((VA_K - VA_{SF} + VA_n)/N_{STD}) + P_{FUT}), \text{tick\_size})$ as described above, of the futures contract from the set of incremental prices which, when multiplied by the determined whole number of the identified futures contracts multiplied by the second quantity of each contract, results in a net value of the determined whole number of the identified futures contracts, e.g. PnL thereof, which comes closest to, without exceeding, the net value of the bilateral contract; calculate a difference between the selected adjusted price and an actual price, e.g. not rounded due to the tick size, which, when multiplied by the determined whole number of the identified futures contracts multiplied by the second quantity of each contract, results in a net value of the determined whole number of the identified futures contracts which equals the net value of the bilateral contract, e.g. the residual left over due to having to round the selected adjust price to the nearest tick (in one embodiment, this is computed as $\text{Residual} = N_{STD} \times (-((VA_K - VA_{SF} \ VA_n)/N_{STD}) \ P_{FUT} - K_{FUT})$ as described above, but may be alternatively computed based on any two inputs of spot price, futures-spot spread, or futures price); generate a first position in each of the determined whole number of the identified futures contracts for the first participant, e.g. the short/seller who is obligated to deliver, at the selected adjusted price ($K_{FUT}$) instead of the current price with respect to the electronic trading system of the exchange computer system 100, and a second position opposite to the first position for the second participant, e.g. the long/buyer obligated to take delivery, with respect to the electronic exchange, the first and second positions being independent of each other; store the first position in a first data record associated with the first participant and the second positions in a second data record associated with the second participant, the first and second data records being stored in a portfolio database 124 of the electronic trading system coupled with the exchange computer system 100 and enabling trading thereof; one of credit and/or debit an account of the first and/or second participant in the amount of the calculated difference; and extinguish the requirement of the bilateral contract for physical delivery of the first quantity of the asset by the first participant to the second participant in exchange for the first predefined payment therefore. It will be appreciated that the first and second data records indicative of the first and second positions may be directly generated and stored directly in the portfolio database 124. Alternatively, the system 300 may generate two or more synthetic trade orders and communicate the generated synthetic trade orders to the electronic trading system of the exchange computer system 100 which, when received by the electronic trading system of the exchange computer system 100 are matched by the match engine module 106 and settled via the settlement module 120, resulting in the first and second positions being created and stored in the portfolio database 124 as described.

Alternatively, the above computer executable instructions or logic components 308-324 may be implemented as one or more separate components, such as on an FPGA which may include a memory or reconfigurable component to store logic and a processing component to execute the stored logic.

In one embodiment, the futures contract is selected from the set of available futures contracts presently traded on the electronic trading system for the delivery of the same asset called for by the bilateral contract and which has the nearest expiration date, i.e. closest to maturity (smallest valuation adjustment). Alternatively, the selected futures contract may be the contract that is most traded or has the most liquidity at the time of selection, or selected via other criteria such as based on a trader preference or convention. For example, where the bilateral contract calls for the physical delivery of a quantity of Euros, the selected futures contact may be the nearest expiring presently trading FX futures contract for Euros. As was described above, this selected futures contract will be characterized by standard parameters, such as:

$P_{FUT}$: the price of the selected futures contract, e.g. at time of settlement of the bilateral forward currency contract, or at a time of best liquidity, or other defined or selected time period;

$N_{STD}$: the notional amount of the selected futures contract based upon the standardized quantity thereof, e.g. 125000 Euro;

Tick size, e.g. 0.00005 U.S. dollar per Euro; and Maturity Date: the date on which the futures contract expires.

In one embodiment, the set of incremental prices comprises a series of incremental discontinuous price values beginning with an initial value, each subsequent value of which exceeds a previous value by a defined increment, e.g. based on the tick size.

As the selected futures contract will be for a standardized quantity (the second quantity), e.g. 125,000 Euro, and the bilateral contract will be for some arbitrary quantity (first quantity), e.g. Euro 100,062,500, multiple of the selected futures contract will be needed. As the fractional futures contracts may not be available, the system 300 must select a whole number quantity of the selected futures contract wherein the total quantity does not exceed the bilateral contract quantity, e.g. 800 of the selected futures contracts at 125000 Euro each, results in a total quantity of Euro 100,000,000 Euro with 62,500 left over.

In one embodiment, the selection of the adjusted price of the futures contract, e.g. $K_{FUT}$, further includes compensating for a difference in the current price of the futures contract and the current value of the first quantity (e.g. valuation adjustment $VA_{SF}$ as described above), a difference in the future date of delivery of the futures contract and the expiration of the bilateral contract (e.g. valuation adjustment $VA_K$ as described above), and a difference between the first quantity and the determined whole number of the identified futures contracts multiplied by the second quantity of each contract (e.g. valuation adjustment $VA_n$ as described above).

In one embodiment, $VA_K$ accounts for the difference in profit or loss between the value of the assigned futures contracts at the actual traded price vs. value of the currency at the forward strike price (what the buyer of the currency is supposed to receive from the forward contract vs. what they will instead have in hand when they receive the generated position in the selected futures contracts, without other adjustments). That is, instead of physical delivery on the forward contract's expiration date, the buyer will receive a position in a quantity of futures contracts which may be worth more or less than they would have if they actually took delivery: (P_fut−Forward Strike)*quantity of futures*quantity per future=P/L if the buyer just cashed out the futures contracts at the trade price vs the strike price.

In one embodiment, $VA_{SF}$ accounts for the delayed delivery of the asset due to the later delivery date of the futures contract compared to taking delivery upon expiration of the forward contract. That is, it is the difference between the current futures trade price and the spot price of the asset multiplied by the quantity of the futures contracts multiplied by the quantity per contract. This adjustment is subtracted from $YA_K$.

In one embodiment, $VA_n$ accounts for the difference due to the total quantity of the asset underlying the futures contracts not being identical, due to the standard quantity of each contract, to the quantity called for by the bilateral contract. That is, the difference between the first quantity and the determined whole number of the identified futures contracts multiplied by the second quantity of each contract and may be calculated, by the processor, as a difference between the net value of the bilateral contract and the net value of the determined whole number of the identified futures contracts.

As was noted above, the first and second positions, i.e. the position in the futures contracts created for the short/seller and the position in the futures contracts created for the long/buyer, being positions in standardized exchange traded and centrally cleared instruments allows either the first position and/or the second position to be disposed of without affecting the other of the first or second positions. For example, the second position may be sold without affecting the first position, and vice versa, either position may be offset by another position held by the respective participant without affecting the position held by the other participant, and/or the first or second position may be netted with a third position held by the respective participant in the portfolio database opposite (or complimentary) thereto to determine a risk of loss of the respective participant.

Figure 4:
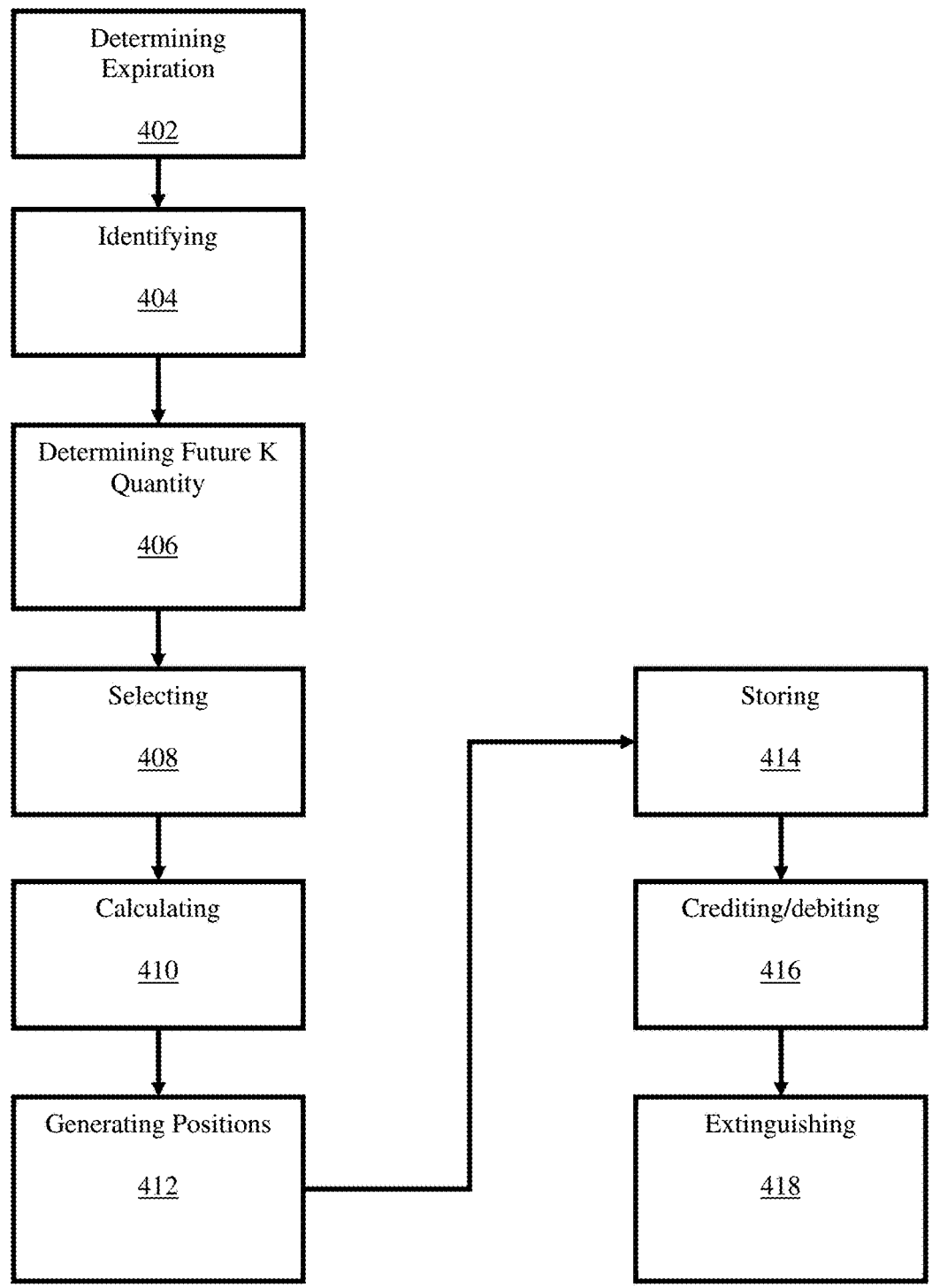
FIG. 4 depicts a flow chart showing the operation of the system of FIG. 3 according to one embodiment.

FIG. 4 depicts a flow chart showing operation of the system 300 of FIGS. 1-3. In particular FIG. 4 shows a method, which may be computer implemented, for automatically enabling deferred physical delivery of a first quantity of an asset, e.g. a currency such as Euros, as required by a bilateral contract, such as a currency forward contract or option contract thereon, which requires, subsequent to expiration, physical delivery of the first quantity of the asset on a particular date by a first participant to a second participant in exchange for a first predefined payment, e.g. in a different currency such as US dollars, therefore according to one embodiment. The operation of the system 500 may include: determining, by a processor 302 of an exchange computer system 100, that a data record stored in a database 306 coupled with the processor 302, which stores data indicative of the bilateral contract, further indicates that the bilateral contract has expired, the expired bilateral contract being characterized at expiration by a net value equal to a difference between a current value of the first quantity of the asset and the first predefined payment (Block 402); identifying, automatically by the processor 302 based on the determination that the bilateral contract has expired, a futures contract currently traded on an electronic trading system implemented by the exchange computer system 100 at a current price, of a set of incremental prices, which calls for delivery at a future date of a second quantity of the asset in exchange for a second predefined payment, the second quantity being less than the first quantity (Block 404); determining, by the processor 302, a whole number of the identified futures contracts, each for the second quantity, which are needed to come closest to, without exceeding, the first quantity (or, alternatively, which just exceed the first quantity) (Block 406); selecting, by the processor 302, an adjusted price of the futures contract from the set of incremental prices which, when multiplied by the determined whole number of the identified futures contracts multiplied by the second quantity of each contract, results in a net value of the determined whole number of the identified futures contracts which comes closest to, without exceeding (or, alternatively, which just exceed), the net value of the bilateral contract (Block 408); calculating, by the processor 302, a difference between the selected adjusted price and an actual price which, when multiplied by the determined whole number of the identified futures contracts multiplied by the second quantity of each contract, results in a net value of the determined whole number of the identified futures contracts which equals the net value of the bilateral contract (Block 410); generating, by the processor 302, a first position in each of the determined whole number of the identified futures contracts for the first participant, e.g. the short/seller, at the selected adjusted price instead of the current price with respect to the electronic trading system, and a second position opposite to the first position for the second participant, e.g. the long/buyer, with respect to the electronic exchange, the first and second positions being independent of each other (Block 412); storing, by the processor 302, the first position in a first data record associated with the first participant and the second positions in a second data record associated with the second participant, the first and second data records being stored in a portfolio database 124 of the electronic trading system coupled with the exchange computer system 100 and enabling trading thereof (Block 414); one of crediting and/or debiting, by the processor 302, an account of the first and/or second participant in the amount of the calculated difference (Block 416); and extinguishing, by the processor 302, the requirement of the bilateral contract for physical delivery of the first quantity of the asset by the first participant to the second participant in exchange for the first predefined payment therefore (Block 418).

It will be appreciated that the first and second data records indicative of the first and second positions may be directly generated and stored directly in the portfolio database 124. Alternatively, the system 300 may generate two or more synthetic trade orders and communicate the generated synthetic trade orders to the electronic trading system of the exchange computer system 100 which, when received by the electronic trading system of the exchange computer system 100 are matched by the match engine module 106 and settled via the settlement module 120, resulting in the first and second positions being created and stored in the portfolio database 124 as described.

In one embodiment, the futures contract is selected from the set of available futures contracts presently traded on the electronic trading system for the delivery of the same asset called for by the bilateral contract and which has the nearest expiration date. For example, where the bilateral contract calls for the physical delivery of a quantity of Euros, the selected futures contact may be the nearest expiring presently trading FX futures contract for Euros. As was describe above, this selected futures contract will be characterized by standard parameters, such as:

$P_{FUT}$: the price of the selected futures contract at time of settlement of the bilateral forward currency contract;

$N_{STD}$: the notional amount of the selected futures contract based upon the standardized quantity thereof, e.g. 125,000 Euro;

Tick size, e.g. 0.00005 U.S. dollar per Euro; and

Maturity Date: the date on which the futures contract expires.

In one embodiment, the set of incremental prices comprises a series of incremental discontinuous price values beginning with an initial value, each subsequent value of which exceeds a previous value by a defined increment, e.g. based on the tick size.

As the selected futures contract will be for a standardized quantity, e.g. 125,000 Euro, and the bilateral contract will be for some arbitrary quantity, e.g. Euro 100,062,500, multiple of the selected futures contract will be needed. As the fractional futures contracts may not be available, the system 300 must select a whole number quantity of the selected futures contract wherein the total quantity does not exceed the bilateral contract quantity, e.g. 800 of the selected futures contracts at 125,000 Euro each, results in a total quantity of Euro 100,000,000 Euro with 62,500 left over.

In one embodiment, the selection of the adjusted price of the futures contract, e.g. $K_{FUT}$, further includes compensating for a difference in the current price of the futures contract and the current value of the first quantity (e.g. $VA_{SF}$ as described above), a difference in the future date of delivery of the futures contract and the expiration of the bilateral contract (e.g. $VA_K$ as described above), and a difference between the first quantity and the determined whole number of the identified futures contracts multiplied by the second quantity of each contract (e.g. $VA_n$ as described above).

In one embodiment, $VA_K$ accounts for the difference in profit or loss between the value of the assigned futures contracts at the actual traded price vs. value of the currency at the forward strike price (what the buyer of the currency is supposed to receive from the forward contract vs. what they will instead have in hand when they receive the generated position in the selected futures contracts, without other adjustments). That is, instead of physical delivery on the forward contract's expiration date, the buyer will receive a position in a quantity of futures contracts which may be worth more or less than they would have if they actually took delivery: (P_fut−Forward Strike)*quantity of futures*quantity per future=P/L if the buyer just cashed out the futures contracts at the trade price vs the strike price.

In one embodiment, $VA_{SF}$ accounts for the delayed delivery of the asset due to the later delivery date of the futures contract compared to taking delivery upon expiration of the forward contract. That is, it is the difference between the current futures trade price and the spot price of the asset multiplied by the quantity of the futures contracts multiplied by the quantity per contract. This adjustment is subtracted from $YA_K$.

In one embodiment, $VA_n$ accounts for the difference due to the total quantity of the asset underlying the futures contracts not being identical, due to the standard quantity of each contract, to the quantity called for by the bilateral contract. That is, the difference between the first quantity and the determined whole number of the identified futures contracts multiplied by the second quantity of each contract and may be calculated, by the processor, as a difference between the net value of the bilateral contract and the net value of the determined whole number of the identified futures contracts.

As was noted above, the first and second positions being positions in standardized exchange traded and centrally cleared instruments allows either the first position and/or the second position to be disposed of without affecting the other of the first or second positions. For example, the second position may be sold without affecting the first position, and vice versa, either position may be offset by another position held by the respective participant without affecting the position held by the other participant, and/or the first or second position may be netted with a third position held by the respective participant in the portfolio database opposite (or complimentary) thereto to determine a risk of loss of the respective participant.

CONCLUSION

The illustrations of the embodiments described herein are intended to provide a general understanding of the structure of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method comprising:
   determining, by a processor, that a data record, stored in a database coupled with the processor, stores data indicative of a bilateral contract specifying an expiration which requires, subsequent to the expiration, a physical delivery, effected via transmission of an electronic transaction to a clearing system separate from the processor, of a first quantity of an asset on a particular date by a first participant to a second participant in exchange for a first payment, the processor further determining that the bilateral contract has expired, the expired bilateral contract being characterized at expiration by a difference between an actual value of the first quantity of the asset and the first payment; and
   prior to transmission of the electronic transaction to the external clearing system:
      identifying, automatically by the processor upon the determination of expiration, a futures contract currently traded on an electronic trading system coupled with the processor which calls for delivery at a future date of a second quantity of the asset in exchange for a second payment, the second quantity being less than the first quantity;
      determining, by the processor, a whole number of the identified futures contracts, each for the second quantity, which approximates the first quantity;
      assigning, by the processor, an adjusted price to the futures contract which conforms with a minimum price increment, which, when multiplied by the determined whole number multiplied by the second quantity, results in a value of the determined whole number of the identified futures contracts which approximates the difference between the actual value of the first quantity of the asset and the first payment, and calculating a difference therebetween;
      generating, by the processor, a first position in each of the determined whole number of the identified futures contracts for the first participant at the assigned adjusted price and a second position opposite to the first position for the second participant, the first and second positions being independently disposable such that the second participant is enabled to obtain the physical delivery of the asset independent of the first participant;
      storing, by the processor, the first position in a first data record associated with the first participant and the second positions in a second data record associated with the second participant, the first and second data records being stored in a portfolio database of the electronic trading system;
      one of crediting and/or debiting, by the processor, an account of the first and/or second participant in the amount of the calculated difference; and
      extinguishing, by the processor, the requirement of the bilateral contract for physical delivery of the first quantity of the asset by the first participant to the second participant and the requirement for the first payment, the electronic transaction therefore not being transmitted to the external clearing system.

2. The computer implemented method of claim 1, wherein the asset comprises a first currency and the predefined payment is denominated in a second currency different from the first currency.

3. The computer implemented method of claim 1, wherein the bilateral contract comprises a forward currency contract.

4. The computer implemented method of claim 1, wherein the minimum price increment defines a series of incremental discontinuous price values beginning with an initial value, each subsequent value of which exceeds a previous value by the minimum price increment.

5. The computer implemented method of claim 1, wherein the assigning of the adjusted price further comprises compensating for the following: a difference in a current price of the futures contract and the current value of the first quantity, a difference in the future date of delivery of the futures contract and the expiration of the bilateral contract, and a difference between the first quantity and the determined whole number of the identified futures contracts multiplied by the second quantity of each contract.

6. The computer implemented method of claim 1, wherein the second position is sold without affecting the first position.

7. The computer implemented method of claim 1, wherein the second position is offset by a third position held by the second participant in the portfolio database opposite the second position without affecting the first position.

8. The computer implemented method of claim 1, wherein the second position is netted with a third position held by the second participant in the portfolio database opposite the second position to determine a risk of loss of the second participant.

9. A system comprising:
first logic stored in a memory and executable by a processor to cause the processor to determine that a data record, stored in a database coupled with the processor, stores data indicative of a bilateral contract specifying an expiration which requires, subsequent to the expiration, a physical delivery, effected via transmission of an electronic transaction to a clearing system separate from the processor, of a first quantity of an asset on a particular date by a first participant to a second participant in exchange for a first payment, the processor further determining that the bilateral contract has expired, the expired bilateral contract being characterized at expiration by a difference between an actual value of the first quantity of the asset and the first payment;
second logic stored in the memory and executable by the processor to cause the processor to automatically identify, upon the determination of expiration and prior to transmission of the electronic transaction to the external clearing system, a futures contract currently traded on an electronic trading system coupled with the processor which calls for delivery at a future date of a second quantity of the asset in exchange for a second payment, the second quantity being less than the first quantity;
third logic stored in the memory and executable by the processor to cause the processor to determine a whole number of the identified futures contracts, each for the second quantity, which approximates the first quantity;
fourth logic stored in the memory and executable by the processor to cause the processor to assign an adjusted price to the futures contract which conforms with a minimum price increment, which, when multiplied by the determined whole number multiplied by the second quantity, results in a value of the determined whole number of the identified futures contracts which approximates the difference between the actual value of the first quantity of the asset and the first payment, and calculates a difference therebetween;
fifth logic stored in the memory and executable by the processor to cause the processor to generate a first position in each of the determined whole number of the identified futures contracts for the first participant at the assigned adjusted price and a second position opposite to the first position for the second participant, the first and second positions being independently disposable such that the second participant is enabled to obtain the physical delivery of the asset independent of the first participant;
sixth logic stored in the memory and executable by the processor to cause the processor to store the first position in a first data record associated with the first participant and the second positions in a second data record associated with the second participant, the first and second data records being stored in a portfolio database of the electronic trading system;
seventh logic stored in the memory and executable by the processor to cause the processor to one of credit and/or debit an account of the first and/or second participant in the amount of the calculated difference; and
eighth logic stored in the memory and executable by the processor to cause the processor to extinguish the requirement of the bilateral contract for physical delivery of the first quantity of the asset by the first participant to the second participant and the requirement for the first payment, the electronic transaction therefore not being transmitted to the external clearing system.

10. The system of claim 9, wherein the asset comprises a first currency and the predefined payment is denominated in a second currency different from the first currency.

11. The system of claim 9, wherein the bilateral contract comprises a forward currency contract.

12. The system of claim 9, wherein the minimum price increment defines a series of incremental discontinuous price values beginning with an initial value, each subsequent value of which exceeds a previous value by the minimum price increment.

13. The system of claim 9, wherein the fourth logic is further executable by the processor to cause the processor to compensate for the following: a difference in a current price of the futures contract and the current value of the first quantity, a difference in the future date of delivery of the futures contract and the expiration of the bilateral contract, and a difference between the first quantity and the determined whole number of the identified futures contracts multiplied by the second quantity of each contract.

14. The system of claim 9, wherein the second position is sold without affecting the first position.

15. The system of claim 9, wherein the second position is offset by a third position held by the second participant in the portfolio database opposite the second position without affecting the first position.

16. The system of claim 9, wherein the second position is netted with a third position held by the second participant in the portfolio database opposite the second position to determine a risk of loss of the second participant.

17. A system comprising:
an exchange computer system including a processor and a memory coupled therewith, the memory storing computer executable program code which when executed by the processor cause the processor to:
- determine that a data record, stored in a database coupled with the processor, stores data indicative of a bilateral contract specifying an expiration which requires, subsequent to the expiration, a physical delivery, effected via transmission of an electronic transaction to a clearing system separate from the processor, of a first quantity of an asset on a particular date by a first participant to a second participant in exchange for a first payment, the processor further determining that the bilateral contract has expired, the expired bilateral contract being characterized at expiration by a difference between an actual value of the first quantity of the asset and the first payment;
- identify, upon the determination of expiration and prior to transmission of the electronic transaction to the external clearing system, a futures contract currently traded on an electronic trading system coupled with the processor which calls for delivery at a future date of a second quantity of the asset in exchange for a second payment, the second quantity being less than the first quantity;
- determine a whole number of the identified futures contracts, each for the second quantity, which approximates the first quantity;
- assign an adjusted price to the futures contract which conforms with a minimum price increment, which, when multiplied by the determined whole number multiplied by the second quantity, results in a value of the determined whole number of the identified futures contracts which approximates the difference between the actual value of the first quantity of the asset and the first payment, and calculate a difference therebetween;
- generate a first position in each of the determined whole number of the identified futures contracts for the first participant at the assigned adjusted price and a second position opposite to the first position for the second participant, the first and second positions being independently disposable such that the second participant is enabled to obtain the physical delivery of the asset independent of the first participant;
- store the first position in a first data record associated with the first participant and the second positions in a second data record associated with the second participant, the first and second data records being stored in a portfolio database of the electronic trading system;
- one of credit and/or debit an account of the first and/or second participant in the amount of the calculated difference; and
- extinguish the requirement of the bilateral contract for physical delivery of the first quantity of the asset by the first participant to the second participant and the requirement for the first payment, the electronic transaction therefore not being transmitted to the external clearing system.

18. The system of claim 17, wherein the asset comprises a first currency and the predefined payment is denominated in a second currency different from the first currency.

19. The system of claim 17, wherein the bilateral contract comprises a forward currency contract.

20. The system of claim 17, wherein the set of incremental prices comprises a series of incremental discontinuous price values beginning with an initial value, each subsequent value of which exceeds a previous value by minimum price increment.

21. The system of claim 17, wherein the computer executable program code further causes the processor to, as part of the assignment, compensate for the following: a difference in the current price of the futures contract and the current value of the first quantity, a difference in the future date of delivery of the futures contract and the expiration of the bilateral contract, and a difference between the first quantity and the determined whole number of the identified futures contracts multiplied by the second quantity of each contract.

22. The system of claim 17, wherein the second position is sold without affecting the first position.

23. The system of claim 17, wherein the second position is offset by a third position held by the second participant in the portfolio database opposite the second position without affecting the first position.

24. The system of claim 17, wherein the second position is netted with a third position held by the second participant in the portfolio database opposite the second position to determine a risk of loss of the second participant.

\* \* \* \* \*